(12) United States Patent
Chung et al.

(10) Patent No.: US 12,277,279 B2
(45) Date of Patent: Apr. 15, 2025

(54) MULTI-DIRECTIONAL OUTPUT DEVICE

(71) Applicant: FORWARD ELECTRONICS CO., LTD., Taipei (TW)

(72) Inventors: Ching-Hao Chung, Taipei (TW); Chun-Lin Huang, Taipei (TW); Hsiu-Chen Li, Taipei (TW)

(73) Assignee: FORWARD ELECTRONICS CO., LTD., Taipei (TW)

( * ) Notice: Subject to any disclaimer, the term of this patent is extended or adjusted under 35 U.S.C. 154(b) by 0 days.

(21) Appl. No.: 18/598,191

(22) Filed: Mar. 7, 2024

(65) Prior Publication Data

US 2024/0361846 A1 Oct. 31, 2024

(30) Foreign Application Priority Data

Apr. 27, 2023 (TW) .................................. 112115700

(51) Int. Cl.
*G06F 3/0338* (2013.01)
(52) U.S. Cl.
CPC .................................. *G06F 3/0338* (2013.01)
(58) Field of Classification Search
CPC .............................. G06F 3/0338; G06F 3/033
See application file for complete search history.

(56) References Cited

U.S. PATENT DOCUMENTS

| | | | | |
|---|---|---|---|---|
| 6,538,639 B1* | 3/2003 | Takahashi | .............. | G05G 9/047 |
| | | | | 345/161 |
| 2022/0155810 A1* | 5/2022 | Nakase | .................. | G05G 9/047 |
| 2023/0084417 A1* | 3/2023 | Zeng | ..................... | H05K 1/189 |
| 2024/0222049 A1* | 7/2024 | Nakase | .................. | H01H 25/04 |

* cited by examiner

*Primary Examiner* — Premal R Patel
(74) *Attorney, Agent, or Firm* — BACON & THOMAS, PLLC

(57) ABSTRACT

A multi-directional output device includes a printed circuit board on which first and second magnetic sensors are arranged, and a direction control unit arranged above the printed circuit board. The direction control unit includes: first and second rotating driving bodies; first and second sliding driving bodies respectively movably connected to the first and second rotating driving bodies; first and second magnets respectively fixed on the first and second sliding driving bodies; and a lower cover on which first and second slide grooves are provided, wherein the first and second sliding driving bodies are respectively slidably arranged in the first and second slide grooves, and the first magnetic sensor and the second magnetic sensor are arranged correspondingly to the first slide groove and the second slide groove, respectively.

13 Claims, 8 Drawing Sheets

MULTI-DIRECTIONAL OUTPUT DEVICE

CROSS-REFERENCE TO RELATED APPLICATIONS

This application claims the benefits of the Taiwan Patent Application Serial Number 112115700, filed on Apr. 27, 2023, the subject matter of which is incorporated herein by reference.

BACKGROUND

Field of the Invention

The present invention relates to a multi-directional output device and, more particularly, to a thin and small-sized non-contact multi-directional output device driven by magnetic sensing.

Description of Related Art

In existing joysticks used as game consoles or wireless joysticks for mobile devices, carbon film resistors are used, for example, to provide control of the joystick. However, since the control using carbon film resistors is a contact operation, the service life is extremely limited due to the wearing problem caused by brush contact, which cannot satisfy the actual requirements.

Furthermore, in order to avoid the drawbacks of contact joysticks, a direct approach is to use non-contact components to provide joystick control, such as using the magnetic induction principle of Hall elements to control the joystick. However, the accuracy of the non-contact joystick is difficult to control, and the structure of the non-contact joystick complicated and bulky, thereby making it unable to meet the requirements for miniaturization.

Therefore, it is desired to provide an improved multi-directional output device so as to mitigate and/or obviate the existing defects.

SUMMARY

The object of the present invention is to provide a multi-directional output device, in which a non-contact magnetic sensor is used so as to eliminate the wearing problem caused by brush contact, thereby greatly increasing the service life, enhancing the resetting accuracy of the operating shaft stick to improve the signal accuracy, and reducing the size to design a thin and small-sized control device.

To achieve the object, the multi-directional output device of the present invention comprises: a printed circuit board disposed thereon a first magnetic sensor and a second magnetic sensor; and a direction control unit provided on the printed circuit board, and including: a first rotating driving body and a second rotating driving body, each being a rotatable elongated arc-shaped structure and each having an elongated center hole disposed in a center of the corresponding elongated arc-shaped structure, wherein the first rotating driving body is disposed above and crossed perpendicularly with the second rotating driving body so that the elongated center holes are aligned with each other; a first sliding driving body and a second sliding driving body respectively movably connected to one end of the first rotating driving body and one end of the second rotating driving body; a first magnet and a second magnet respectively fixed on one side of the first sliding driving body and one side of the second sliding driving body; a lower cover having a first slide groove and a second slide groove respectively corresponding to the first sliding driving body and the second sliding driving body, wherein the first sliding driving body is slidably disposed in the first slide groove, and the second sliding driving body is slidably disposed in the second slide groove; a shaft stick having an upper end and a lower end, wherein the upper end passes through the elongated center holes from bottoms of the first rotating driving body and the second rotating driving body; a balance washer disposed under the shaft stick and in contact with the first rotating driving body and the second rotating driving body; and an annular spring disposed under the balance washer and in contact with the balance washer, wherein the first magnetic sensor and the second magnetic sensor are arranged to respectively correspond to the first slide groove and the second groove.

Other novel features of the disclosure will become more apparent from the following detailed description when taken in conjunction with the accompanying drawings.

DETAILED DESCRIPTION OF EMBODIMENT

Figure 1:
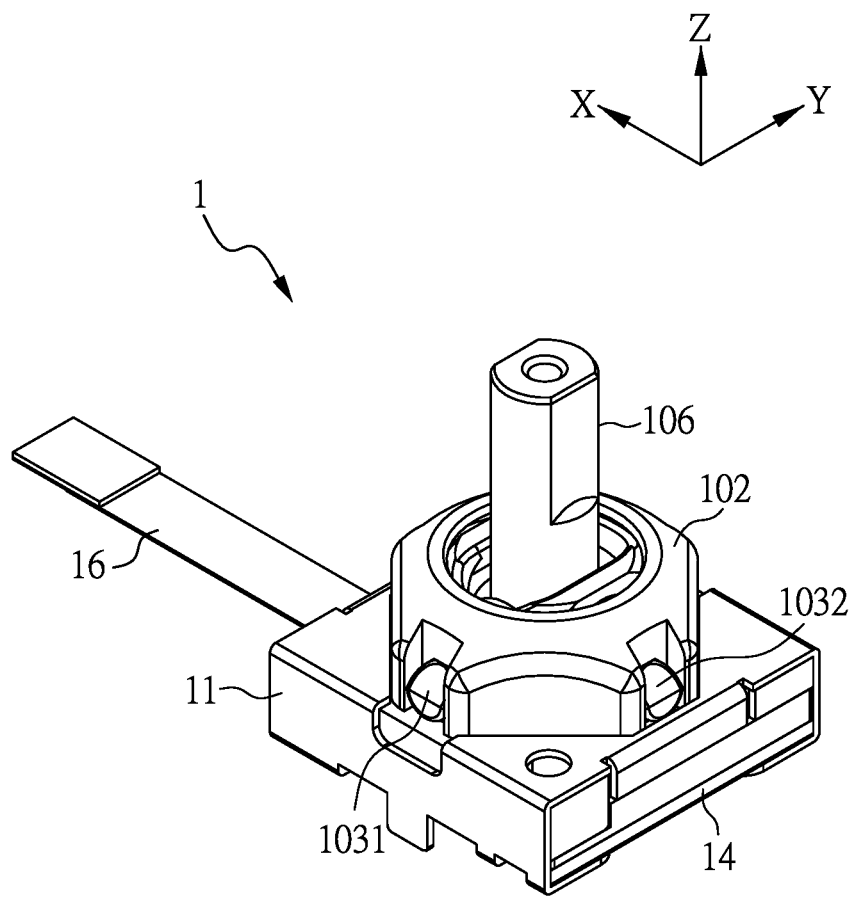
FIG. 1 is a perspective view of a multi-directional output device according to a preferred embodiment of the present invention.
Figure 2:
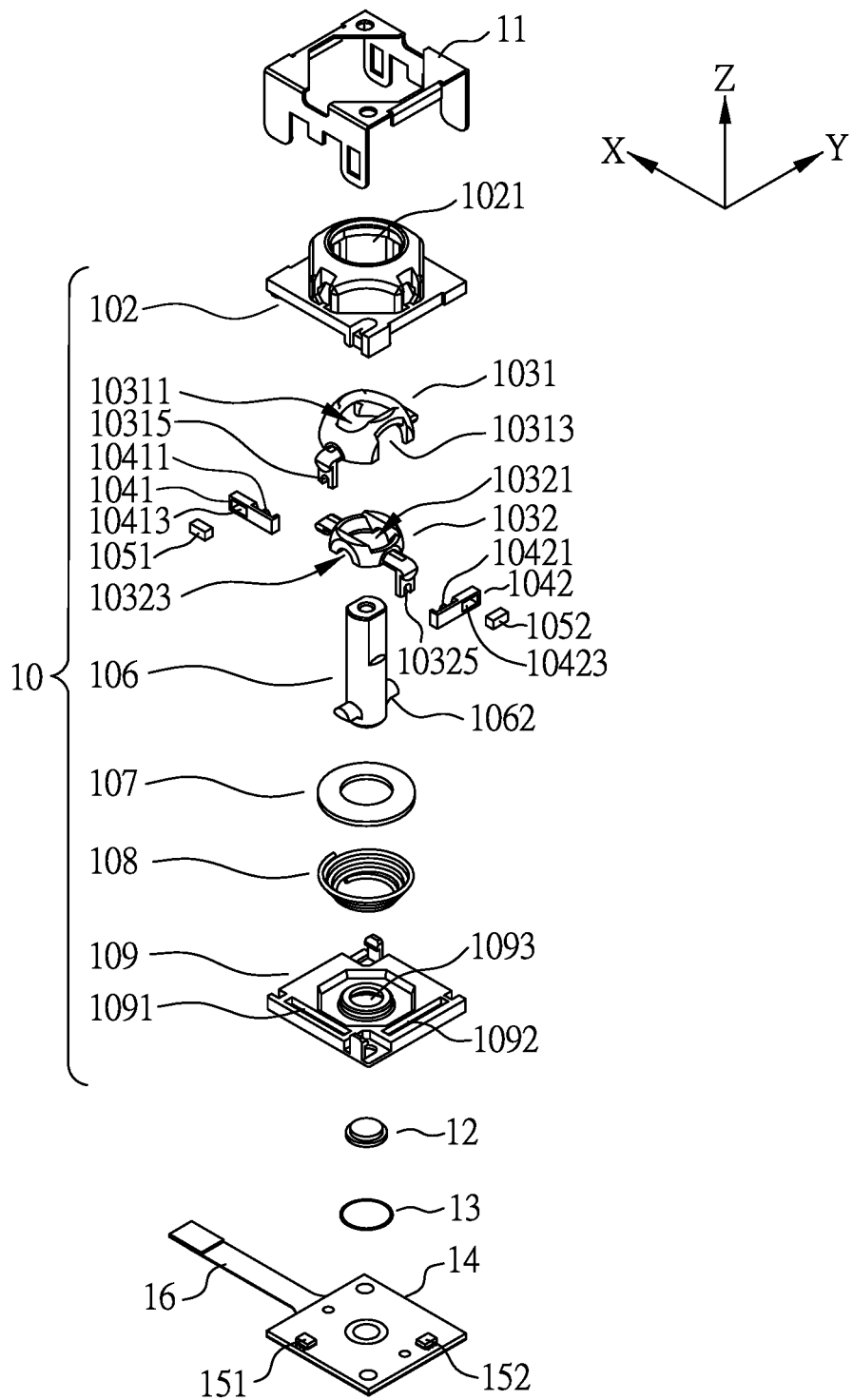
FIG. 2 is an exploded view of a multi-directional output device according to a preferred embodiment of the present invention.

Please refer to FIG. 1 and FIG. 2, which are respectively a perspective view and an exploded view of a multi-directional output device according to a preferred embodiment of the present invention. As shown, a multi-directional output device 1 includes an outer frame 11, a direction control unit 10, a pressing driving body 12, a switch spring piece 13, a printed circuit board 14, a first magnetic sensor 151, a second magnetic sensor 152 and a flat cable 16. The direction control unit 10 is disposed on the printed circuit board 14, and includes an upper cover 102, a first rotating driving body 1031, a second rotating driving body 1032, a first sliding driving body 1041, a second sliding driving body 1042, a first magnet 1051, a second magnet 1052, a shaft stick 106, a balance washer 107, an annular spring 108 and a lower cover 109.

In the aforementioned direction control unit 10, the upper cover 102 has an opening 1021 and the upper cover 102 is disposed on the lower cover 109, so that the upper cover 102 and the lower cover 109 are combined in a snapping or screwing manner, for example, in which an accommodation space is provided to accommodate the first rotating driving body 1031, the second rotating driving body 1032, the first sliding driving body 1041, the second sliding driving body 1042, the first magnet 1051, the second magnet 1052, the shaft stick 106, the balance washer 107, the annular spring 108 and other components. The aforementioned outer frame 11 is disposed above the direction control unit 10, and is combined with the printed circuit board 14 from top to bottom, between which the direction control unit 10, the pressing driving body 12 and the switch spring piece 13 are accommodated.

The aforementioned first rotating driving body 1031 and the second rotating driving body 1032 are each a rotatable elongated arc-shaped structure, and each has an elongated center hole 10311, 10321 disposed in the center of the elongated arc-shaped structure, and two recessed portions 10313, 10323 respectively disposed on two sides of the elongated arc-shaped structure. After assembly, the long side of the elongated arc-shaped structure of the first rotating driving body 1031 extends in the second direction (Y-axis direction), and the long side of the elongated arc-shaped structure of the rotating driving body 1032 extends in the first direction (X-axis direction). The first rotating driving body 1031 and the second rotating driving body 1032 are arranged in a manner that the first rotating driving body 1031 is disposed above the second rotating driving body 1032 and the two are substantially crossed perpendicularly to each other, so that the elongated center holes 10311 and 10321 of the two are crossed and aligned with each other. The second rotating driving body 1032 is engaged into the recessed portion 10313 of the first rotating driving body 1031. Furthermore, the first rotation driving body 1031 is provided with a first engagement portion 10315 at one end of its elongated arc-shaped structure, and the second rotating driving body 1032 is provided with a second engagement portion 10325 at one end of its elongated arc-shaped structure.

The first sliding driving body 1041 is provided with a first concave portion 10411 on one side, and a first accommodation groove 10413 on the opposite side thereof. The second sliding driving body 1042 is provided with a second concave portion 10421 on one side, and a second accommodation groove 10423 on the opposite side thereof. The first magnet 1051 is fixed on one side of the first sliding driving body 1041, and the second magnet 1052 is fixed on one side of the second sliding driving body 1042. Preferably, the first magnet 1051 is accommodated in the first accommodation groove 10413 of the first sliding driving body 1041, and the first magnet 1051 may be fixed in the first accommodation groove 10413 by glue, and the second magnet 1052 is accommodated in the second accommodation groove 10423 of the second sliding driving body 1042, and the second magnet 1052 may be fixed in the second accommodation groove 10423 by glue.

Furthermore, the first sliding driving body 1041 is movably connected to one end of the first rotating driving body 1031, and the second sliding driving body 1042 is movably connected to one end of the second rotating driving body 1032. Preferably, the first rotating driving body 1031 has its first engagement portion 10315 non-fixedly engaged into the first concave portion 10411 of the first sliding driving body 1041, so that the first sliding driving body 1041 is movably connected to one end of the first rotating driving body 1031, thereby converting the rotation angle of the first rotating driving body 1031 into the sliding distance of the first sliding driving body 1041. The second rotating driving body 1032 has its second engagement portion 10325 non-fixedly engaged into the second concave portion 10421 of the second sliding driving body 1042, so that the second sliding driving body 1042 is movably connected to one end of the second rotating driving body 1032, thereby converting the rotation angle of the second rotating driving body 1032 into the sliding distance of the second sliding driving body 1042.

Figure 3:
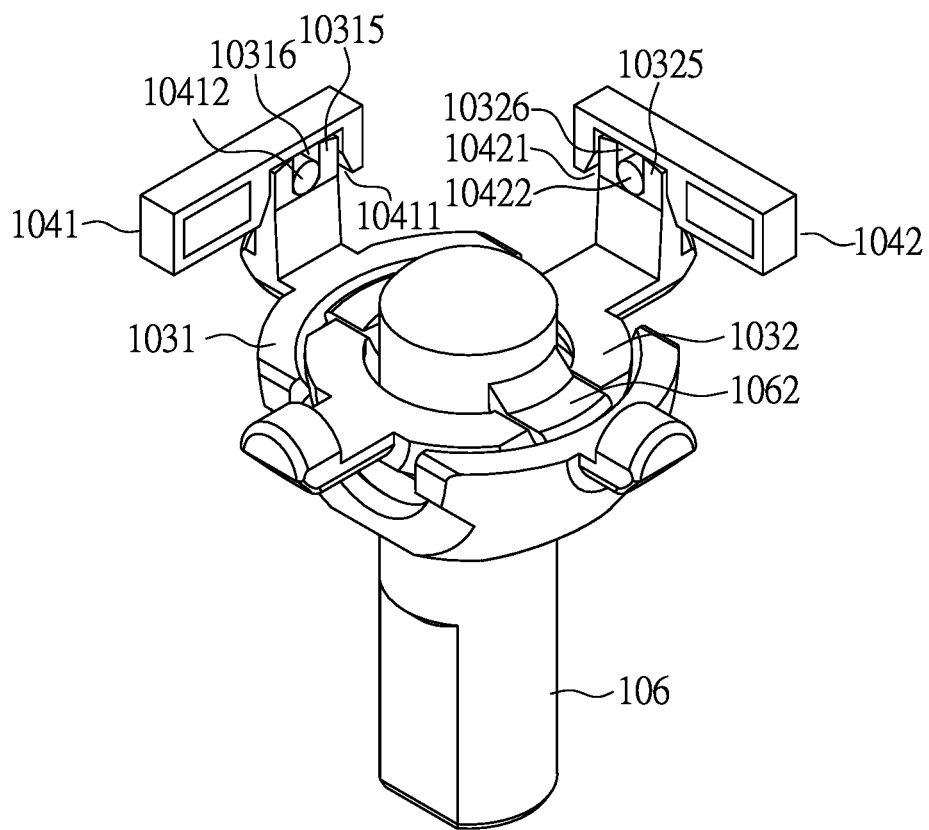
FIG. 3 shows the detailed structure of the connection between the first sliding driving body and the first rotating driving body and the connection between the second sliding driving body and the second rotating driving body according to an embodiment of the present invention.

Furthermore, FIG. 3 shows the detailed structure of the connection between the first sliding driving body 1041 and the first rotating driving body 1031 and the connection between the second sliding driving body 1042 and the second rotating driving body 1032 according to an embodiment of the present invention. As shown, the first engagement portion 10315 of the first rotating driving body 1031 has an arc-shaped groove 10316, and the first concave portion 10411 of the first sliding driving body 1041 is provided with a circular convex column 10412 corresponding to the arc-shaped groove 10316. By engaging the circular convex column 10412 into the arc-shaped groove 10316, the first engagement portion 10315 of the first rotating driving body 1031 may be non-fixedly engaged into the first concave portion 10411 of the first sliding driving body 1041. Because the circular convex column 10412 and the arc-shaped groove 10316 are rotatably moved toward each other, the rotation angle of the first rotating driving body 1031 may be converted into the sliding distance of the first sliding driving body 1041. Similarly, the second engagement portion 10325 of the second rotating driving body 1032 has an arc-shaped groove 10326, and the second concave portion 10421 of the second sliding driving body 1042 is provided with a circular convex column 10422 corresponding to the arc-shaped groove 10326. By engaging the circular convex column 10422 into the arc-shaped groove 10326, the second engagement portion 10325 of the second rotating driving body 1032 may be non-fixedly engaged into the second concave portion 10421 of the second sliding driving body 1042. Because the circular convex column 10422 and the arc-shaped groove 10326 are rotatably moved toward each other, the rotation angle of the second rotating driving body 1032 may be converted into the sliding distance of the second sliding driving body 1042.

One end (upper end) of the shaft stick 106 passes from the bottom of the first rotating driving body 1031 and the second rotating driving body 1032 through the elongated center holes 10311, 10321 of the two and through the opening 1021 of the upper cover 102, so as to allow the user to control. The other end (lower end) of the shaft stick 106 has two sides each having a protruding portion 1062. After assembly, the protruding portion 1062 is combined with the recessed portion 10323 of the second rotating driving body 1032 to prevent the shaft stick 106 from unexpected rotation. The balance washer 107 is disposed below the shaft stick 106, and may be in contact with the lower ends of the first rotating driving body 1031 and the second rotating driving body 1032. The annular spring 108 is arranged on the lower cover 109, and is disposed below the balance washer 107 and in contact with the balance washer 107. The lower cover 109 is provided with a first slide groove 1091 and a second slide groove 1092 on a surface facing the upper cover 102. The first slide groove 1091 extends along the first direction (X-axis direction) and corresponds to the first sliding driving body 1041. The second slide groove 1092 extends along the second direction (Y-axis direction) and corresponds to the second sliding driving body 1042. After assembly, the first sliding driving body 1041 is slidably disposed in the first slide groove 1091, and the second sliding driving body 1042 is slidably disposed in the second slide groove 1092.

Figure 4A:
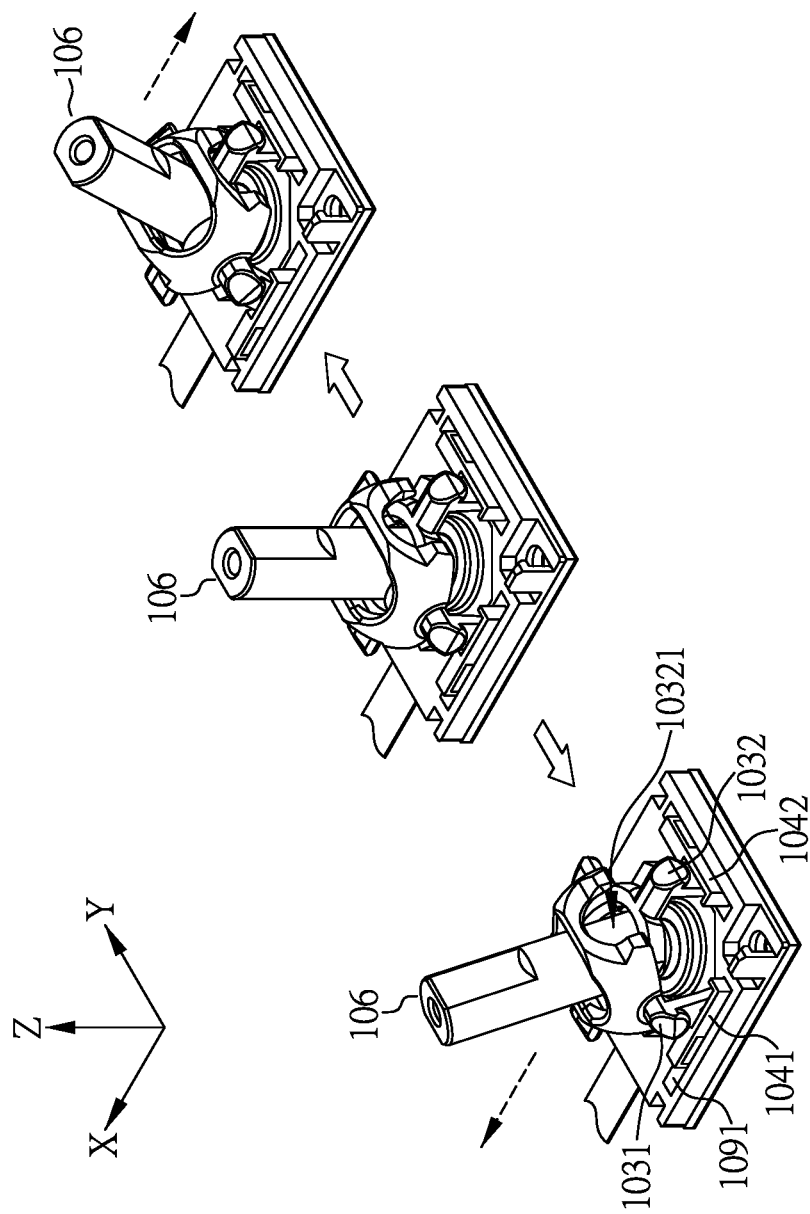
FIG. 4A is a schematic diagram of the multi-directional output device in which rocking of shaft stick in the first direction is performed according to a preferred embodiment of the present invention.
Figure 4B:
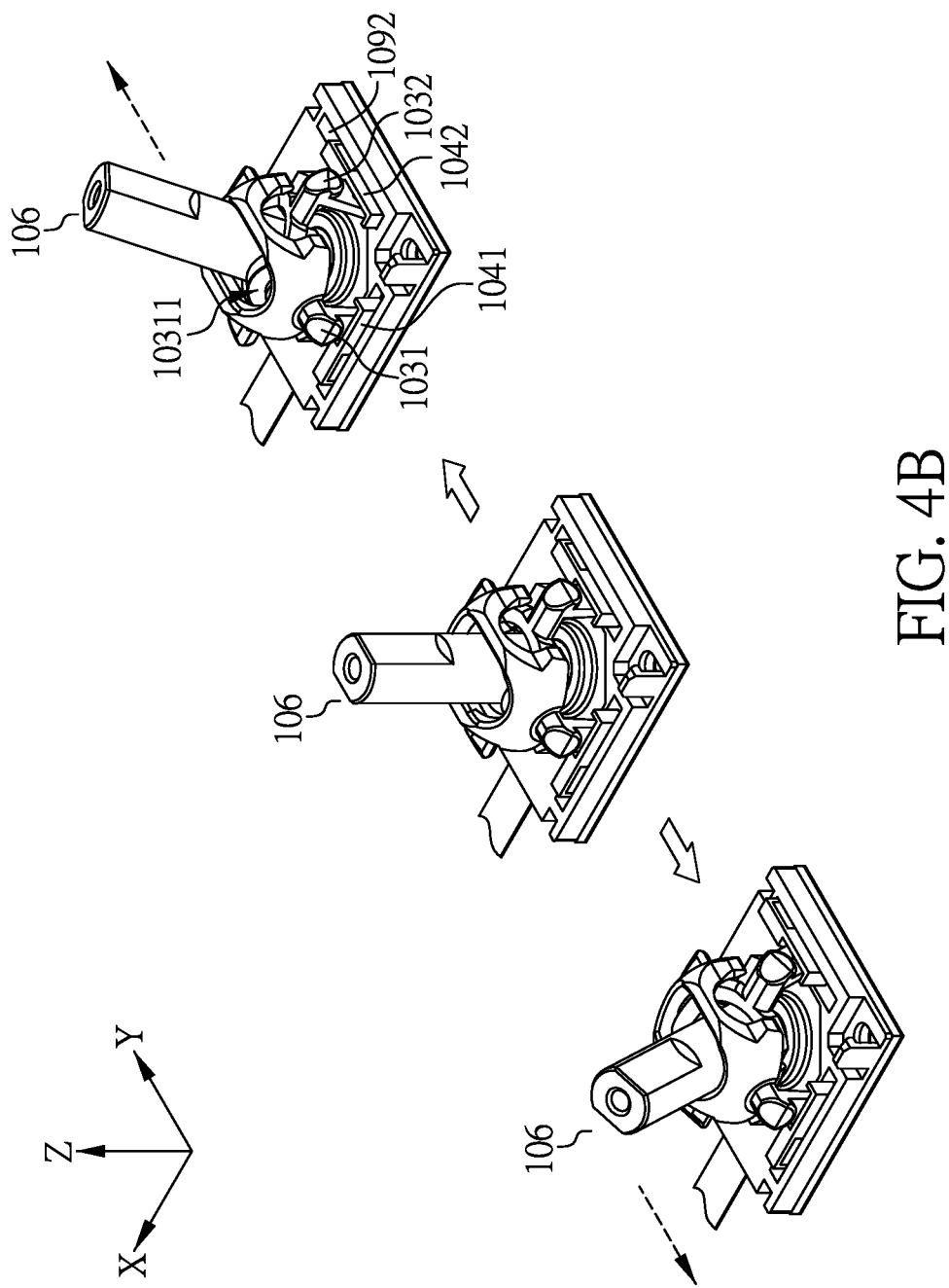
FIG. 4B is a schematic diagram of the multi-directional output device in which rocking of shaft stick in the second direction is performed according to a preferred embodiment of the present invention.

With the direction control unit 10, the shaft stick 106 may be manipulated by the user to rock in the 360-degree direction of the plane formed by the first direction (X-axis direction) and the second direction (Y-axis direction), wherein the first direction and the second direction are substantially perpendicular to each other. When rocking the shaft stick 106 in the first direction (X-axis direction), with reference to FIG. 4A as well, the shaft stick 106 drives the first rotating driving body 1031 to rotate slightly in the counterclockwise direction and, at this moment, the rotation of the first rotating driving body 1031 will draw the first sliding driving body 1041 to slide a distance in the first slide groove 1091 and in the first direction (X-axis direction). In addition, the shaft stick 106 is tangent to and moves in the elongated center hole 10321 of the second rotating driving body 1032 and, at this moment, the second rotating driving body 1032 does not rotate so that the second sliding driving body 1042 does not slide. When rocking the shaft stick 106 in the second direction (Y-axis direction), with reference to FIG. 4B as well, the shaft stick 106 drives the second rotating driving body 1032 to rotate slightly in the clockwise direction and, at this moment, the rotation of the second rotating driving body 1032 will draw the second sliding driving body 1042 to slide a distance in the second slide groove 1092 and in the second direction (Y-axis direction). In addition, the shaft stick 106 is tangent to and moves in the elongated center hole 10311 of the first rotating driving body 1031 and, at this moment, the first rotating driving body 1031 does not rotate so the first sliding driving body 1041 does not slide.

The above is an example of the shaft stick 106 rocking in the first direction and the second direction to facilitate the explanation that the shaft stick 106 drives the first rotating driving body 1031 and the second rotating driving body 1032 to rotate so as to further draw the first sliding driving body 1041 and the second sliding driving body 1042 to slide. However, in the present invention, the shaft stick 106 may be rocked in any direction at the intersection point of the axis in the first direction (X-axis direction) and the axis in the second direction (Y-axis direction). For example, when rocking the shaft stick 106 in a direction that is not completely aligned with the first direction (X-axis direction), in addition to driving the first rotating driving body 1031 to rotate and then drawing the first sliding driving body 1041 to slide a distance in the first direction (X-axis direction), it also drives the second rotating driving body 1032 to rotate and then draws the second sliding driving body 1042 to slide a distance in the second direction (Y-axis direction). For another example, when rocking the shaft stick 106 in a direction that is not completely aligned with the second direction (Y-axis direction), in addition to driving the second rotating driving body 1032 to rotate and then drawing the second sliding driving body 1042 to slide a distance in the second direction (Y-axis direction), it also drives the first rotating driving body 1031 to rotate and then draws the first sliding driving body 1041 to slide a distance in the first direction (X-axis direction). That is, when rocking the shaft stick 106 in the 360-degree direction of the plane formed by the first direction and the second direction, the shaft stick 106 may selectively drive the first rotating driving body 1031 and the second rotating driving body 1032 to rotate at the same time and then draw the first sliding driving body 1041 and the second sliding driving body 1042 to slide. Moreover, the first sliding driving body 1041 and the second sliding driving body 1042 are slidably disposed in the first slide groove 1091 and the second slide groove 1092, respectively, and thus, with the arrangement of the first slide groove 1091 and the second slide groove 1092, it is able to limit the sliding of the first sliding driving body 1041 and the second sliding driving body 1042, and prevent the first magnet 1051 and the second magnet 1052 from falling out of the first sliding driving body 1041 and the second sliding driving body 1042.

Furthermore, with the arrangement of the annular spring 108 and the balance washer 107, a force for resetting the shaft stick 106 may be provided, so that the shaft stick 106 may return to its original vertical state after rocking. The annular spring 108 disposed under the balance washer 107 pushes the balance washer 107 upward with its elastic force to further push the first rotating driving body 1031 and the second rotating driving body 1032, so that the balance washer 107 is coplanar with the contact surface at the lower ends of the first rotating driving body 1031 and the second rotating driving body 1032, thereby resetting the shaft stick 106 to a vertical state. Therefore, after the user rocks the shaft stick 106 from the vertical state toward the first direction or the second direction, the shaft stick 106 may automatically return to its original vertical state.

Figure 5:
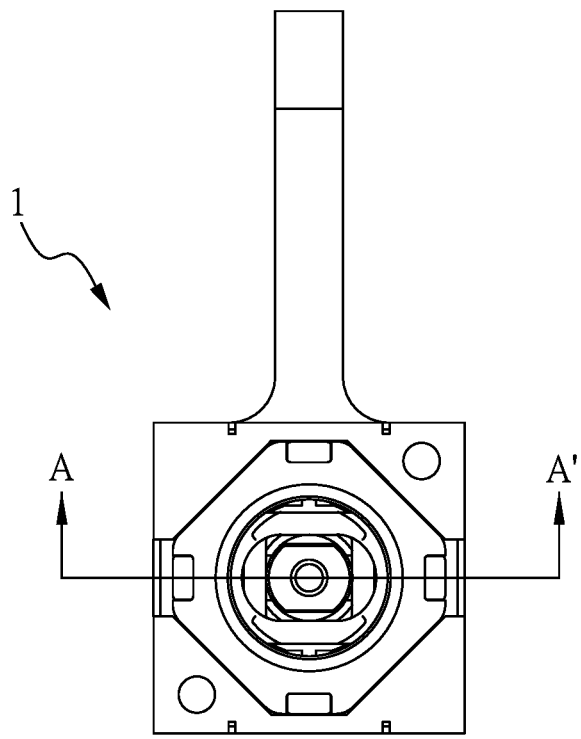
FIG. 5 shows a top view of the multi-directional output device according to a preferred embodiment of the present invention.
Figure 6:
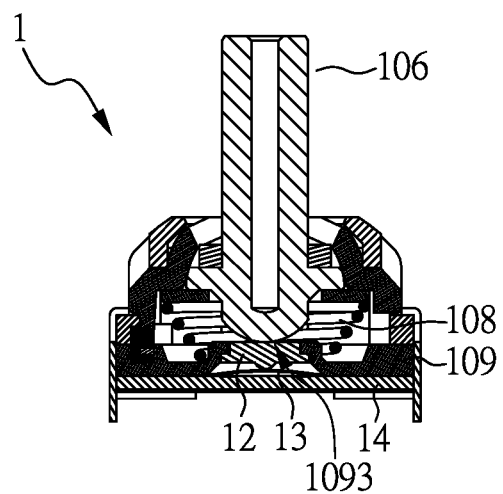
FIG. 6 shows a cross-sectional view of the multi-directional output device taken along line A-A' in FIG. 5.

Please refer to FIG. 2 again, the lower cover 109 has a pressing hole 1093 disposed at the center of the lower cover 109 and corresponding to the lower end of the shaft stick 106, and the first slide groove 1091 and second slide groove 1092 respectively disposed on locations adjacent to two neighboring sides of the lower cover 109 and respectively corresponding to the first sliding driving body 1041 and the second sliding driving body 1042. The switch spring piece 13 is provided on the printed circuit board 14, and the pressing driving body 12 is provided on the switch spring piece 13 and corresponds to the lower end of the shaft stick 106 through the pressing hole 1093 of the lower cover 109. Accordingly, in order to show the operation of the multi-directional output device 1 being used as a pressing switch, FIG. 5 shows a top view of the multi-directional output device 1 according to a preferred embodiment of the present invention, and FIG. 6 is a cross-sectional view of the multi-directional output device taken along line A-A' in FIG. 5, in which the user may press the shaft stick 106 and, with the elastic force of the annular spring 108, the lower end of the shaft stick 106 is made to push downwards against the pressing driving body 12 through the pressing hole 1093 of the lower cover 109, so that the pressing driving body 12 may press the switch spring piece 13 to perform the pressing switch operation on the circuit components of the printed circuit board 14.

Figure 7:
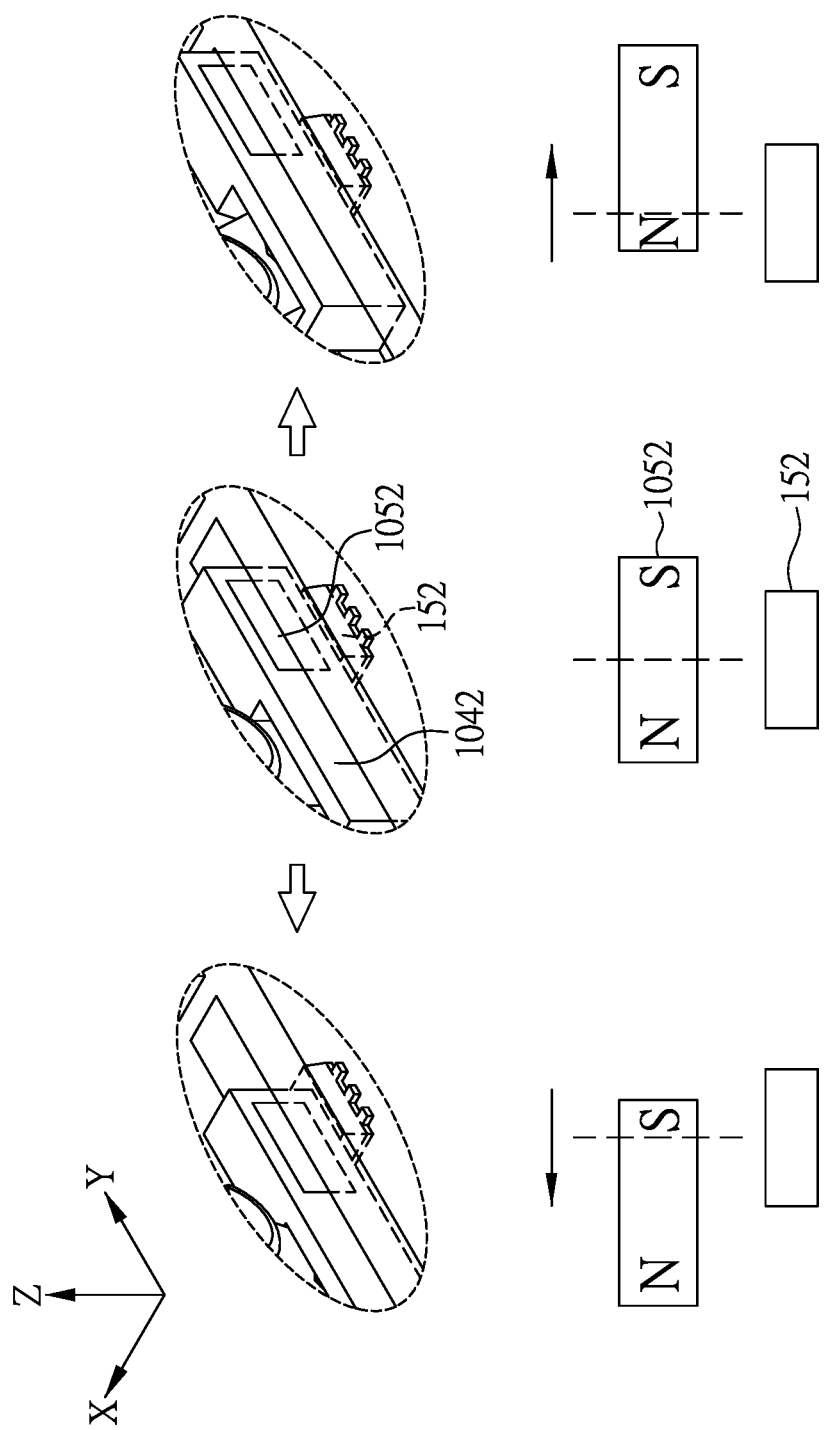
FIG. 7 shows the position change of the second magnet when rocking the shaft stick of the multi-directional output device in the second direction according to an embodiment of the present invention.
Figure 8:
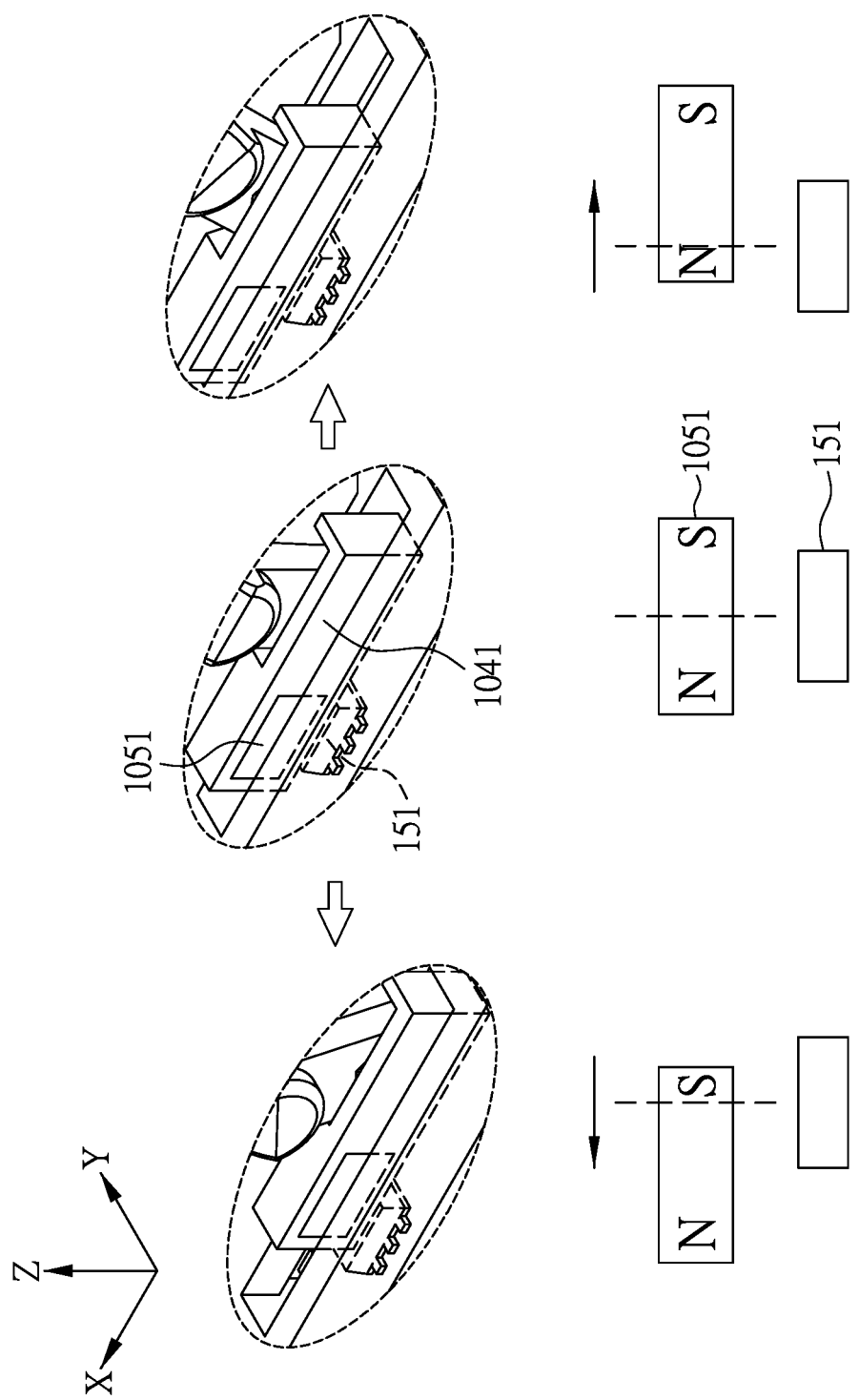
FIG. 8 shows the position change of the first magnet when rocking the shaft stick of the multi-directional output device in the first direction according to an embodiment of the present invention.

The first magnetic sensor 151 and the second magnetic sensor 152 are arranged on the printed circuit board 14, and are disposed adjacent to two adjacent sides of the printed circuit board 14 and respectively corresponding to the first slide groove 1091 and second slide groove 1092 on the lower cover 109 above the printed circuit board 14. Therefore, when rocking the shaft stick 106 in the second direction (Y-axis direction), for example, as shown in FIG. 7, the second magnet 1052 in the second sliding driving body 1042 also moves in the second direction (Y-axis direction) to cause a position change, and the second magnetic sensor 152 may sense a change in the magnetic field of the second magnet 1052 changes as the change in position. Similarly, when rocking the shaft stick 106 in the first direction (X-axis direction), for example, as shown in FIG. 8, the first magnet 1051 in the first sliding driving body 1041 also moves in the first direction (X-axis direction) to cause a position change, and the first magnetic sensor 151 may sense a change in the magnetic field of the first magnet 1051 as the change in position. Accordingly, it can be seen that, when rocking the shaft stick 106 in any direction of the plane formed by the first direction and the second direction, the first magnetic sensor 151 and the second magnetic sensor 152 may respectively sense the changes in the magnetic field of the first magnet 1051 and the second magnet 1052 following the changes in angles, and the magnetic field and magnetic field change signals acquired by the first magnetic sensor 151 and the second magnetic sensor 152 are converted through the circuit on the printed circuit board 14 into corresponding electrical signals for output through the flat cable 16, with which the data related to speed, force, direction, distance, etc. applied by the user for rocking the shaft stick 106 can be calculated, thereby achieving non-contact control.

With the above design, the present invention makes use of two magnetic sensors to sense changes in the magnetic field of two magnets that may slide in response to the rocking of the shaft stick, so that it is possible to perform manipulation in a non-contact manner without the wearing problem caused by brush contact, thereby greatly increasing the service life and strengthening the reset accuracy in operating the shaft stick to improve the signal accuracy. Moreover, since the shaft stick may be used as a button, there is no need to install additional buttons, which may further reduce the size so as to design a thin and small-sized control device.

The aforementioned specific embodiments should be construed as merely illustrative, and not limiting the rest of the present disclosure in any way.

The invention claimed is:

1. A multi-directional output device, comprising:
a printed circuit board disposed thereon a first magnetic sensor and a second magnetic sensor; and
a direction control unit provided on the printed circuit board, and including:
a first rotating driving body and a second rotating driving body, each being a rotatable elongated arc-shaped structure and each having an elongated center hole disposed in a center of the corresponding elongated arc-shaped structure, wherein the first rotating driving body is disposed above and crossed perpendicularly with the second rotating driving body so that the elongated center holes are aligned with each other;
a first sliding driving body and a second sliding driving body respectively movably connected to one end of the first rotating driving body and one end of the second rotating driving body;
a first magnet and a second magnet respectively fixed on one side of the first sliding driving body and one side of the second sliding driving body;
a lower cover having a first slide groove and a second slide groove respectively corresponding to the first sliding driving body and the second sliding driving body,
wherein the first sliding driving body is slidably disposed in the first slide groove, and the second sliding driving body is slidably disposed in the second slide groove;
a shaft stick having an upper end and a lower end, wherein the upper end passes through the elongated center holes from bottoms of the first rotating driving body and the second rotating driving body;
a balance washer disposed under the shaft stick and in contact with the first rotating driving body and the second rotating driving body; and
an annular spring disposed under the balance washer and in contact with the balance washer,
wherein the first magnetic sensor and the second magnetic sensor are arranged to respectively correspond to the first slide groove and the second groove.

2. The multi-directional output device as claimed in claim 1, wherein the first sliding driving body has a first accommodation groove to accommodate the first magnet, and the second sliding driving body has a second accommodation groove to accommodate the second magnet.

3. The multi-directional output device as claimed in claim 2, wherein the first magnet and the second magnet are respectively adhered to the first accommodation groove and the second accommodation groove by glue.

4. The multi-directional output device as claimed in claim 1, wherein the first sliding driving body has a first concave portion, and the first rotating driving body has a first engagement portion non-fixedly engaged into the first concave portion so as to convert a rotation angle of the first rotating driving body into a sliding distance of the first sliding driving body; the second sliding driving body has a second concave portion, and the second rotating driving body has a second engagement portion non-fixedly engaged into the second concave portion so as to convert a rotation angle of the second rotating driving body into a sliding distance of the second sliding driving body.

5. The multi-directional output device as claimed in claim 4, wherein the first engagement portion has an arc-shaped groove, and a circular convex column corresponding to the arc-shaped groove is provided in the first concave portion for being engaged into the arc-shaped groove, and wherein the second engagement portion has an arc-shaped groove, and a circular convex column corresponding to the arc-shaped groove is provided in the second concave portion for being engaged into the arc-shaped groove.

6. The multi-directional output device as claimed in claim 1, wherein, when rocking the shaft stick in a first direction, the shaft stick drives the first rotating driving body to rotate and draws the first sliding driving body to slide in the first slide groove and in the first direction, and the shaft stick is tangent to and moves in the elongated center hole of the second rotating driving body; when rocking the shaft stick in a second direction, the shaft stick drives the second rotating driving body to rotate and draws the second sliding driving body to slide in the second slide groove and in the second direction, and the shaft stick is tangent to and moves in the elongated center hole of the first rotating driving body, where the first direction is perpendicular to the second direction.

7. The multi-directional output device as claimed in claim 6, wherein, when rocking the shaft stick in any direction on a plane formed by the first direction and the second direction, the shaft stick selectively drives the first rotary driving body and the second rotary driving body simultaneously to rotate, and draws the first sliding driving body and the second sliding driving body to slide in the first direction and the second direction, respectively.

8. The multi-directional output device as claimed in claim 1, further comprising: a switch spring piece disposed on the printed circuit board; and a pressing driving body disposed on the switch spring piece and corresponding to the lower end of the shaft stick.

9. The multi-directional output device as claimed in claim 8, further comprising an outer frame disposed above the direction control unit and combined with the printed circuit board from top to bottom so as to accommodate the direction control unit, the pressing driving body and the switch spring piece.

10. The multi-directional output device as claimed in claim 1, wherein each of the first rotating driving body and the second rotating driving body has two recessed portions respectively disposed on two sides of the corresponding elongated arc-shaped structure, and the second rotating driving body is engaged into the two recessed portions of the first rotating driving body.

11. The multi-directional output device as claimed in claim 10, wherein the lower end of the shaft stick has two sides, each having a protruding portion, and the two protruding portions are combined with the two recessed portions of the second rotating driving body.

12. The multi-directional output device as claimed in claim 1, wherein the lower cover further has a pressing hole disposed at a center of the lower cover and corresponding to the lower end of the shaft stick.

13. The multi-directional output device as claimed in claim 12, further comprising an upper cover disposed above the lower cover and provided with an opening, wherein the upper cover is combined with the lower cover to provide an accommodation space to accommodate the first rotating driving body, the second rotating driving body, the first sliding driving body, the second sliding driving body, the first magnet, the second magnet, the shaft stick, the balance washer and the annular spring, and the upper end of the shaft stick passes through the opening of the upper cover.

\* \* \* \* \*